United States Patent
El-Hilo et al.

(10) Patent No.: US 9,058,650 B2
(45) Date of Patent: Jun. 16, 2015

(54) METHODS, APPARATUSES, AND COMPUTER PROGRAM PRODUCTS FOR IDENTIFYING A REGION OF INTEREST WITHIN A MAMMOGRAM IMAGE

(71) Applicant: McKesson Financial Holdings, Hamilton (BM)

(72) Inventors: Saba El-Hilo, Vancouver (CA); Mahmoud Ramze Rezaee, Vancouver (CA)

(73) Assignee: McKesson Financial Holdings, Hamilton (BM)

( * ) Notice: Subject to any disclaimer, the term of this patent is extended or adjusted under 35 U.S.C. 154(b) by 0 days.

(21) Appl. No.: 14/317,353

(22) Filed: Jun. 27, 2014

(65) Prior Publication Data

US 2014/0307937 A1    Oct. 16, 2014

Related U.S. Application Data

(63) Continuation of application No. 13/182,055, filed on Jul. 13, 2011, now Pat. No. 8,781,187.

(51) Int. Cl.
G06T 7/00    (2006.01)
G06K 9/00    (2006.01)

(52) U.S. Cl.
CPC .............. *G06T 7/0012* (2013.01); *G06K 9/00* (2013.01); *G06T 7/0081* (2013.01); *G06T 2207/20076* (2013.01); *G06T 2207/20148* (2013.01); *G06T 2207/30068* (2013.01); *G06T 2207/20021* (2013.01); *G06T 2207/20156* (2013.01)

(58) Field of Classification Search
USPC ................... 382/128–134, 173–180
See application file for complete search history.

(56) References Cited

U.S. PATENT DOCUMENTS

| | | | | |
|---|---|---|---|---|
| 4,340,911 A | * | 7/1982 | Kato et al. | 382/128 |
| 4,945,478 A | * | 7/1990 | Merickel et al. | 382/131 |
| 5,133,020 A | * | 7/1992 | Giger et al. | 382/128 |
| 5,452,367 A | * | 9/1995 | Bick et al. | 382/128 |
| 5,454,050 A | * | 9/1995 | Nakabayashi et al. | 382/165 |
| 5,579,360 A | * | 11/1996 | Abdel-Mottaleb | 378/37 |
| 5,757,953 A | * | 5/1998 | Jang | 382/132 |
| 5,790,690 A | * | 8/1998 | Doi et al. | 382/128 |
| 5,809,161 A | * | 9/1998 | Auty et al. | 382/104 |
| 5,818,624 A | | 10/1998 | Patterson et al. | |
| 5,832,103 A | * | 11/1998 | Giger et al. | 382/130 |

(Continued)

OTHER PUBLICATIONS

Notice of Allowance for U.S. Appl. No. 13/233,656 dated Jan. 7, 2013.

(Continued)

*Primary Examiner* — Alex Liew
(74) *Attorney, Agent, or Firm* — Alston & Bird LLP

(57) ABSTRACT

Methods, apparatuses, and computer program products are provided for identifying a region of interest within a mammogram image. A method may include applying a clustering algorithm to a histogram of the mammogram image to identify a predefined number of threshold values. The method may further include determining a predefined number of seed values based at least in part on the identified threshold values. The method may additionally include generating a kernel image for each of the seed values. The method may also include using the generated kernel images to identify a region of interest including a breast within the mammogram image. Corresponding apparatuses and computer program products are also provided.

20 Claims, 9 Drawing Sheets

(56) References Cited

U.S. PATENT DOCUMENTS

| | | | | |
|---|---|---|---|---|
| 5,832,118 | A * | 11/1998 | Kim | 382/224 |
| 6,072,892 | A * | 6/2000 | Kim | 382/117 |
| 6,091,841 | A * | 7/2000 | Rogers et al. | 382/132 |
| 6,282,307 | B1 * | 8/2001 | Armato et al. | 382/132 |
| 6,463,173 | B1 * | 10/2002 | Tretter | 382/168 |
| 6,546,130 | B1 * | 4/2003 | Inoue et al. | 382/162 |
| 6,865,297 | B2 * | 3/2005 | Loui et al. | 382/224 |
| 6,985,612 | B2 * | 1/2006 | Hahn | 382/128 |
| 7,136,518 | B2 | 11/2006 | Griffin et al. | |
| 7,324,669 | B2 * | 1/2008 | Nakanishi et al. | 382/118 |
| 7,391,895 | B2 * | 6/2008 | Wang et al. | 382/132 |
| 7,459,696 | B2 | 12/2008 | Schomacker et al. | |
| 7,469,160 | B2 | 12/2008 | Banks et al. | |
| 7,756,316 | B2 * | 7/2010 | Odry et al. | 382/131 |
| 7,822,255 | B2 * | 10/2010 | Schutz | 382/132 |
| 7,903,861 | B2 * | 3/2011 | Luo et al. | 382/132 |
| 8,260,048 | B2 * | 9/2012 | Jin | 382/173 |
| 2002/0028008 | A1 * | 3/2002 | Fan et al. | 382/131 |
| 2002/0165837 | A1 * | 11/2002 | Zhang et al. | 706/16 |
| 2003/0169915 | A1 * | 9/2003 | Takeo | 382/132 |
| 2003/0212327 | A1 * | 11/2003 | Wang et al. | 600/437 |
| 2004/0008886 | A1 * | 1/2004 | Boykov | 382/173 |
| 2004/0196250 | A1 | 10/2004 | Mehrotra et al. | |
| 2004/0258305 | A1 * | 12/2004 | Burnham et al. | 382/171 |
| 2005/0174309 | A1 | 8/2005 | Bouwens et al. | |
| 2006/0159321 | A1 * | 7/2006 | Takeo et al. | 382/128 |
| 2007/0014488 | A1 * | 1/2007 | Chen et al. | 382/294 |
| 2007/0055143 | A1 | 3/2007 | Deroo et al. | |
| 2007/0086640 | A1 * | 4/2007 | Luo et al. | 382/132 |
| 2008/0002872 | A1 * | 1/2008 | Gatesoupe et al. | 382/132 |
| 2008/0089568 | A1 * | 4/2008 | Delenstarr | 382/128 |
| 2008/0130964 | A1 * | 6/2008 | Zwirn et al. | 382/128 |
| 2008/0212864 | A1 * | 9/2008 | Bornefalk | 382/132 |
| 2008/0266413 | A1 * | 10/2008 | Cohen et al. | 348/222.1 |
| 2009/0003672 | A1 * | 1/2009 | Maier et al. | 382/128 |
| 2009/0129673 | A1 * | 5/2009 | Simon et al. | 382/173 |
| 2009/0220139 | A1 * | 9/2009 | Schneider et al. | 382/132 |
| 2009/0232376 | A1 * | 9/2009 | Raundahl et al. | 382/131 |
| 2009/0324073 | A1 * | 12/2009 | Wengler et al. | 382/168 |
| 2010/0166281 | A1 * | 7/2010 | Burger et al. | 382/131 |
| 2010/0272367 | A1 * | 10/2010 | Criminisi et al. | 382/195 |
| 2010/0322489 | A1 * | 12/2010 | Tizhoosh et al. | 382/128 |
| 2011/0013819 | A1 * | 1/2011 | Raundahl et al. | 382/132 |
| 2011/0158491 | A1 * | 6/2011 | Markova et al. | 382/128 |
| 2011/0182501 | A1 | 7/2011 | Mercier et al. | |
| 2011/0257519 | A1 | 10/2011 | Bjornerud et al. | |
| 2012/0014585 | A1 * | 1/2012 | Morita et al. | 382/132 |
| 2012/0093399 | A1 * | 4/2012 | Paik et al. | 382/164 |
| 2012/0207366 | A1 * | 8/2012 | Liu | 382/128 |
| 2013/0016884 | A1 * | 1/2013 | El-Hilo et al. | 382/128 |
| 2013/0187958 | A1 | 7/2013 | Kimpe et al. | |
| 2013/0287313 | A1 | 10/2013 | Marchessoux et al. | |

OTHER PUBLICATIONS

Adams, R., et al.; "Seeded region growing"; IEEE Transactions on Pattern Analysis and Machine Intelligence; vol. 16; Issue 6; Jun. 1994; pp. 641-647.

Arifin, A.Z., et al.; "Image segmentation by histogram thresholding using hierarchical cluster analysis"; Pattern Recognition Letters; 2006; pp. 1-7.

Besl, P.J., et al.; "Segmentation Through Variable-Order Surface Fitting"; IEEE Transactions on Pattern Analysis and Machine Intelligence; vol. 10; Issue 2; Mar. 1998; pp. 167-192.

Cootes, T.F., et al.; "Active Appearance Models"; IEEE Transactions on Pattern Analysis and Machine Intelligence; vol. 23; No. 6; Jun. 2001; pp. 681-685.

Cootes, T.F., et al.; "Active Shape Models—Their Training and Application"; Computer Vision and Image Understanding; vol. 61; Issue 1; Jan. 1995; pp. 38-59.

Dijkstra, E.W.; "A Note on Two Problems in Connexion with Graphs"; Numerische Mathematik; vol. 1; 1959; pp. 269-271.

Pham, D.L., et al.; "Current Methods in Medical Image Segmentation"; Annual Review of Biomedical Engineering; vol. 2; Aug. 2000; pp. 315-337.

Rezaee, M.R., et al.; "A Multiresolution Image Segmentation Technique Based on Pyramidal Segmentation and Fuzzy Clustering"; IEEE Transactions on Image Processing; vol. 9; Issue 7; Jul. 2000; pp. 1238-1248.

Tanaka, N., et al.; "Application of Grayscale Standard Display Function to General Purpose Liquid-Crystal Display Monitors for Clinical Use"; Jul. 2009; pp. 25-32.

PS 3.14-2009, Digital Imaging and Communications in Medicine (DICOM), Part 14: Grayscale Standard Display Function; National Electrical Manufacturers Association, 2009; 55 pages.

*About Gamma Correction* http://www.graphics.stanford.edu/gamma.html (3 pgs.) site visited Feb. 8, 2011 9:00 AM.

CGSD—Gamma Correction Explained http://www.siggraph.org/education/materials/HyperGraph/gamma_corr . . . (3 pgs.) Site visited Feb. 8, 2011 9:00 AM.

* cited by examiner

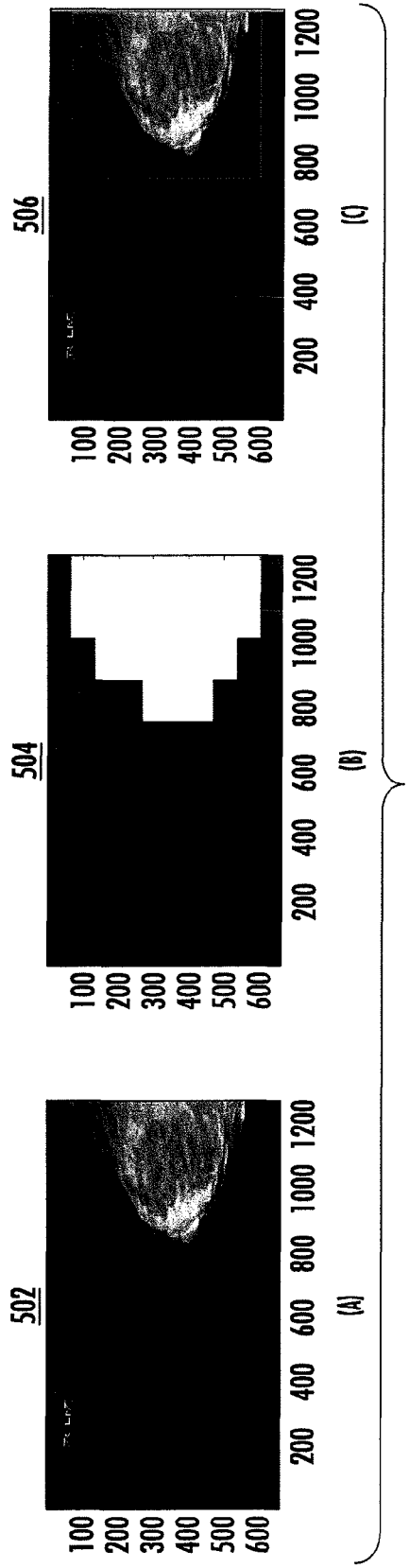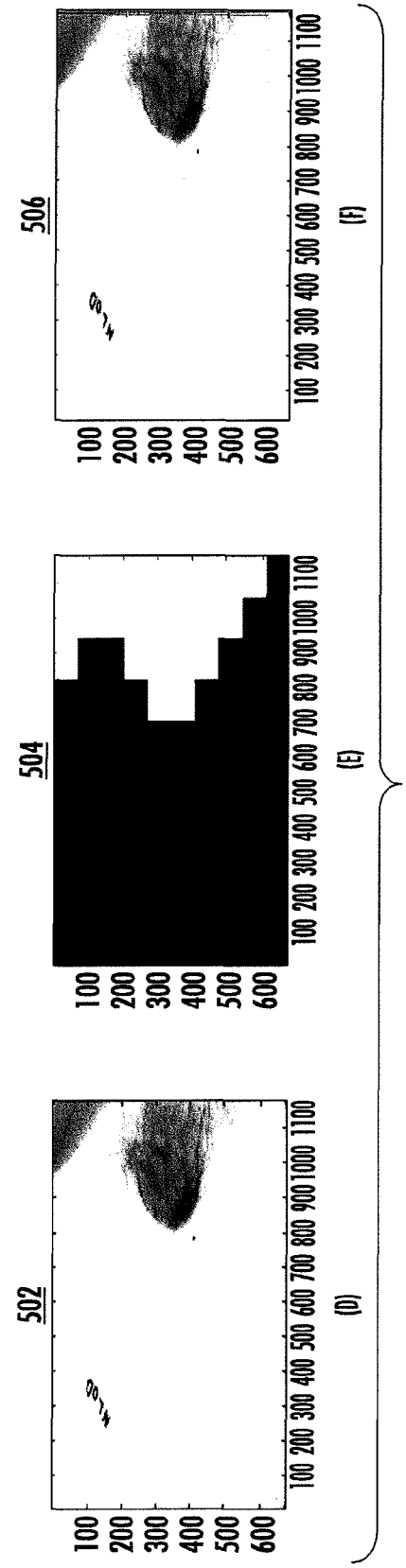
FIG. 5A
FIG. 5B

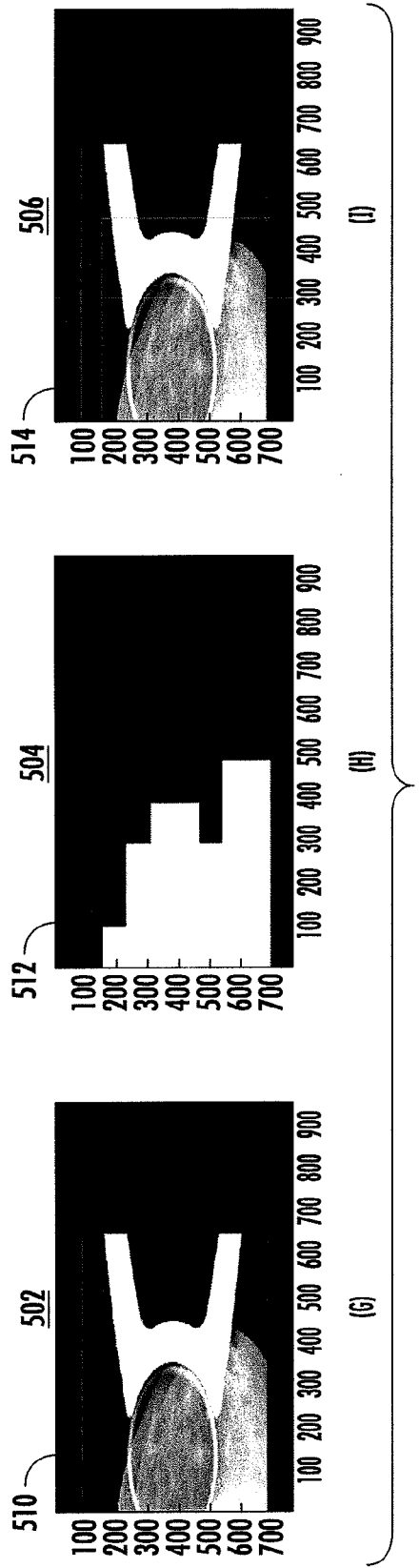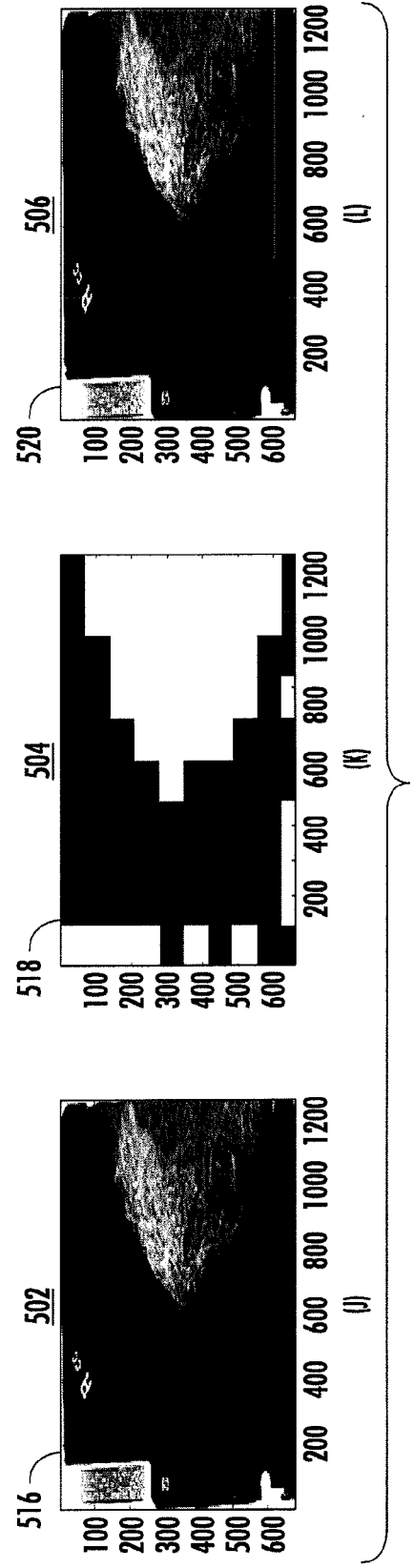
FIG. 5C
FIG. 5D

METHODS, APPARATUSES, AND COMPUTER PROGRAM PRODUCTS FOR IDENTIFYING A REGION OF INTEREST WITHIN A MAMMOGRAM IMAGE

CROSS REFERENCE TO RELATED APPLICATIONS

This application is a continuation application of U.S. application Ser. No. 13/182,055, filed Jul. 13, 2011, which is hereby incorporated herein in its entirety by reference.

TECHNOLOGICAL FIELD

Embodiments of the present invention relate generally to medical imaging technology and, more particularly, to methods, apparatuses, and computer program products for identifying a region of interest within a mammogram image.

BACKGROUND

Breast cancer is a leading cause of death for women, and digital mammography screening is often used to help identify this cancer at its early development stage. In this regard, digital mammography devices are used to acquire mammogram images as part of screening procedures. The acquired mammogram images are sent to review workstations where radiologists review them for signs of cancer or other abnormalities.

Unfortunately, while use of digital mammography is quite helpful in facilitating early detection of breast cancer, examination of a mammogram image by a radiologist may be quite burdensome to the radiologist. In this regard certain rules, such as those defined by Mammography Quality Standards Act (MQSA) and the United States Food and Drug Administration (FDA), govern the presentation of the images of a mammography to the radiologist. Given the current lack of technology for facilitating mammography examination in adherence to these rules, the burden imposed on a radiologist in manually manipulating a digital mammogram image to comply with these rules may be quite costly in terms of the time required to examine a mammography study. Accordingly, throughput in terms of a number of studies that may be examined by a radiologist over a period of time may be limited. This limitation in throughput may impact a standard of patient care, as patients may have to wait a longer period of time to receive mammogram results. Further, as costs of a mammography study may be based in part on a time required for a radiologist to examine the study, costs of this burden may be heavily born by patients and insurance providers.

One such rule governing examination of mammography studies requires radiologists to review mammogram images in their full acquired resolution. Unfortunately, when viewed at their native acquired resolution, mammogram images often do not fit within the confines of a single monitor or of an available viewport. Accordingly, radiologists are often required to zoom and/or pan the images to make sure all portions of the image are observed and/or reviewed to ensure that the totality of the breast region of a mammogram image is reviewed. Further zooming/panning may be required when images of a study are compared to old studies with different zoom settings or positioning. Such manual user interaction is inconvenient and time consuming for a radiologist.

BRIEF SUMMARY OF SOME EXAMPLES OF THE INVENTION

Methods, apparatuses, and computer program products are herein provided for identifying a region of interest within a mammogram image. These methods, apparatuses, and computer program products may provide several advantages to radiologists, insurers, patients, and computing devices used for digital mammography. In this regard, some example embodiments provide for automatic identification of a region of interest including a breast within a mammogram image. Some such example embodiments may advantageously distinguish a breast region from background, noise, and external objects that may be captured in the mammogram image. Accordingly, such example embodiments may enable automatic zooming/panning to allow a radiologist to view the region of interest within the mammogram image. Further, such example embodiments may be used to facilitate automatic placement of text overlays outside of the breast region.

In a first example embodiment, a method for identifying a region of interest within a mammogram image is provided. The method of this example embodiment may comprise applying a clustering algorithm to a histogram of the mammogram image to identify a predefined number of threshold values. The method of this example embodiment may further comprise determining a predefined number of seed values based at least in part on the identified threshold values. The method of this example embodiment may additionally comprise generating a kernel image for each of the seed values. The method of this example embodiment may also comprise using the generated kernel images to identify a region of interest comprising a breast within the mammogram image.

In another example embodiment, an apparatus for identifying a region of interest within a mammogram image is provided. The apparatus of this embodiment comprises at least one processor. The at least one processor may be configured to cause the apparatus of this example embodiment to apply a clustering algorithm to a histogram of the mammogram image to identify a predefined number of threshold values. The at least one processor may be further configured to cause the apparatus of this example embodiment to determine a predefined number of seed values based at least in part on the identified threshold values. The at least one processor may be additionally configured to cause the apparatus of this example embodiment to generate a kernel image for each of the seed values. The at least one processor may also be configured to cause the apparatus of this example embodiment to use the generated kernel images to identify a region of interest comprising a breast within the mammogram image.

In a further example embodiment, a computer program product for identifying a region of interest within a mammogram image is provided. The computer program product of this embodiment includes at least one non-transitory computer-readable storage medium having computer-readable program instructions stored therein. The program instructions of this example embodiment may comprise program instructions configured to apply a clustering algorithm to a histogram of the mammogram image to identify a predefined number of threshold values. The program instructions of this example embodiment may further comprise program instructions configured to determine a predefined number of seed values based at least in part on the identified threshold values. The program instructions of this example embodiment may additionally comprise program instructions configured to generate a kernel image for each of the seed values. The program instructions of this example embodiment may also comprise program instructions configured to identify a region of interest comprising a breast within the mammogram image.

In yet another example embodiment, an apparatus for identifying a region of interest within a mammogram image is provided. The apparatus of this example embodiment may comprise means for applying a clustering algorithm to a histogram of the mammogram image to identify a predefined number of threshold values. The apparatus of this example embodiment may further comprise means for determining a predefined number of seed values based at least in part on the identified threshold values. The apparatus of this example embodiment may additionally comprise means for generating a kernel image for each of the seed values. The apparatus of this example embodiment may also comprise means for using the generated kernel images to identify a region of interest comprising a breast within the mammogram image.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the invention in any way. It will be appreciated that the scope of the invention encompasses many potential embodiments, some of which will be further described below, in addition to those here summarized.

BRIEF DESCRIPTION OF THE DRAWINGS

Figure 1:
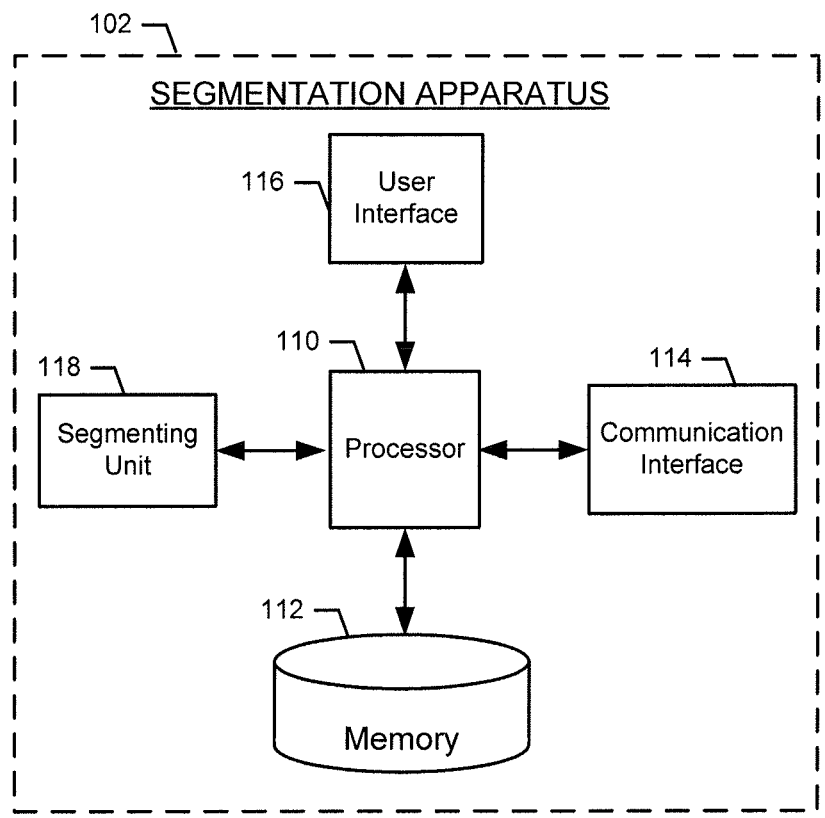
Figure 2:
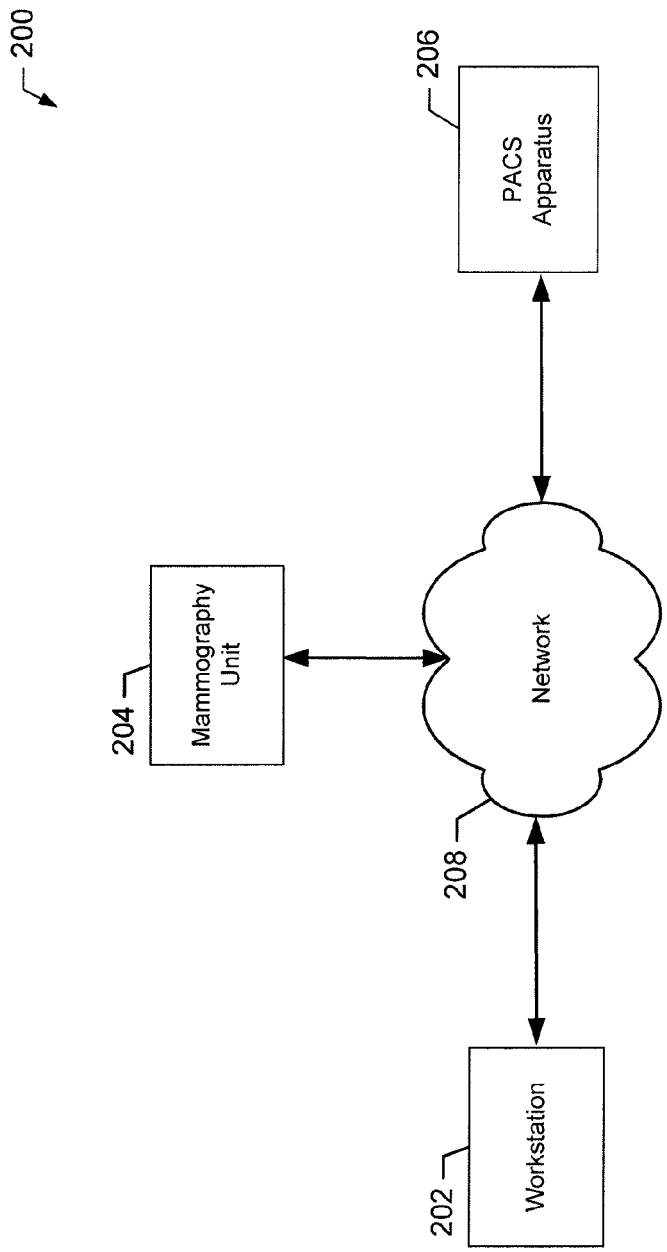
Figure 3:
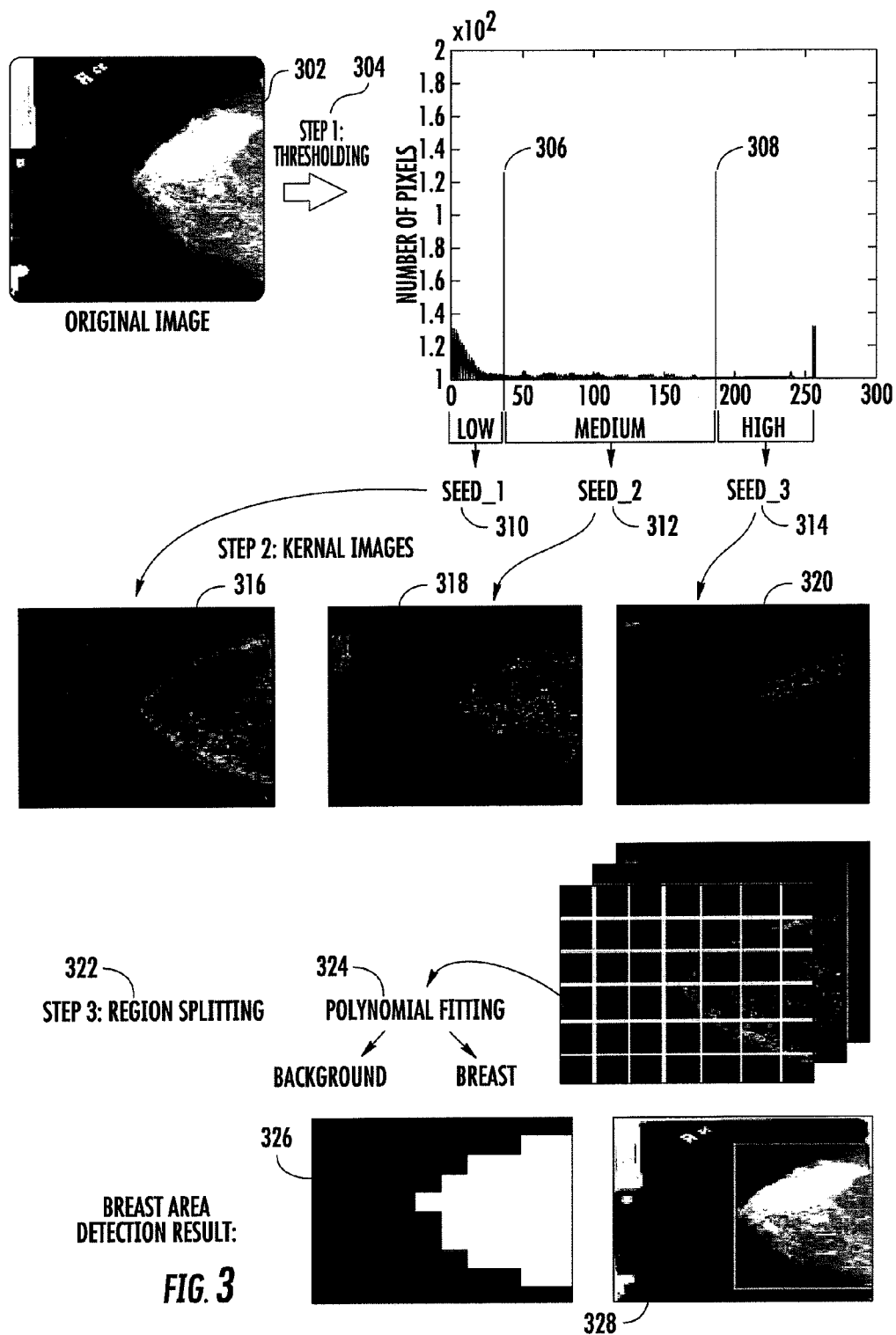
Figure 4A:
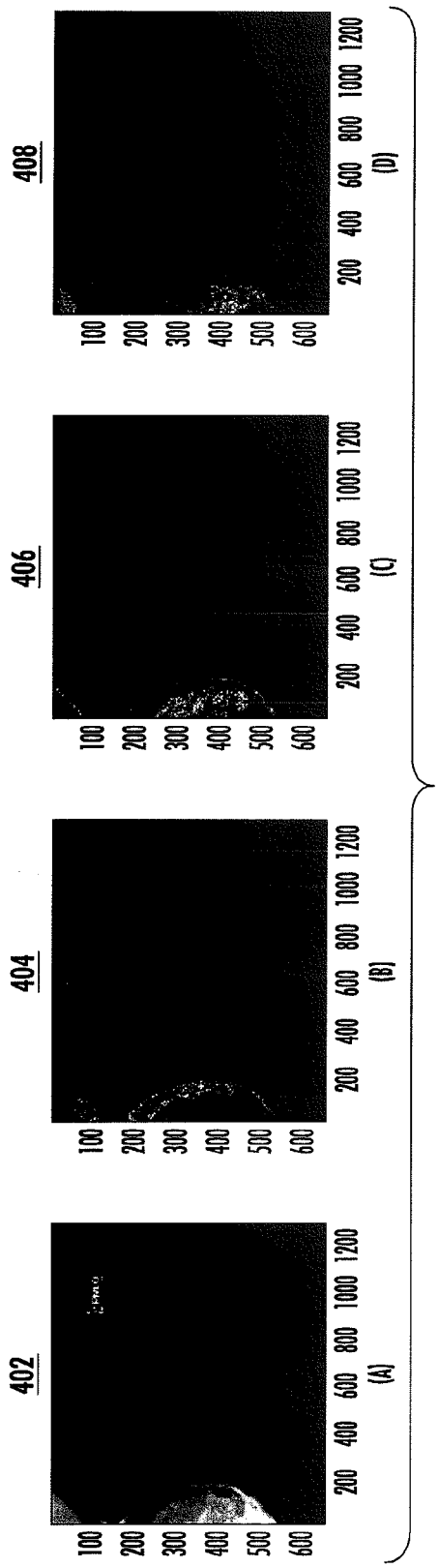
Figure 4B:
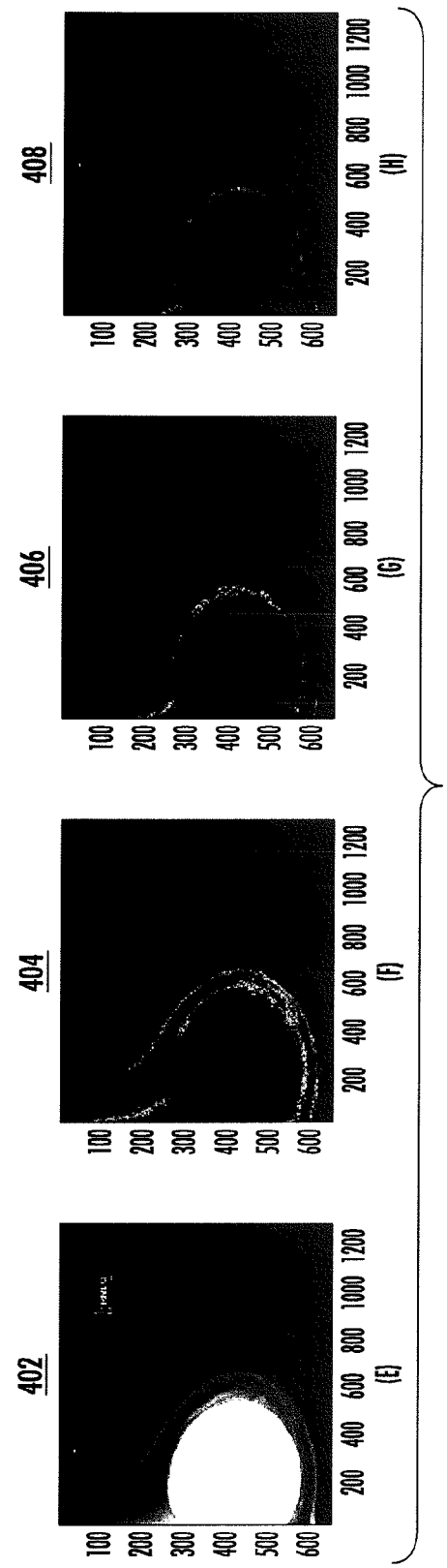
Figure 4C:
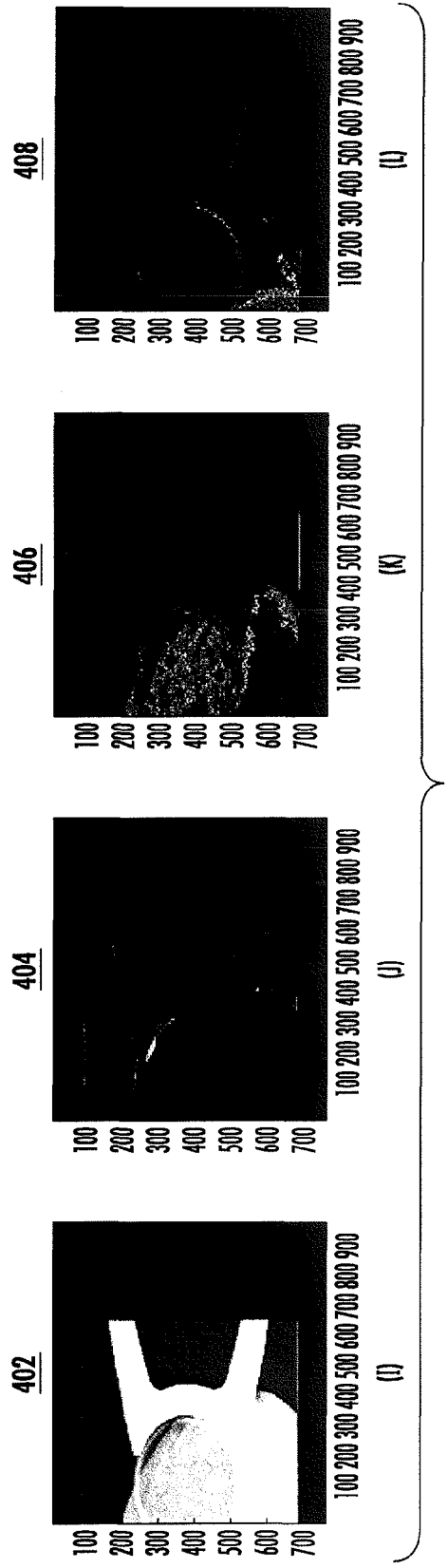
Figure 4D:
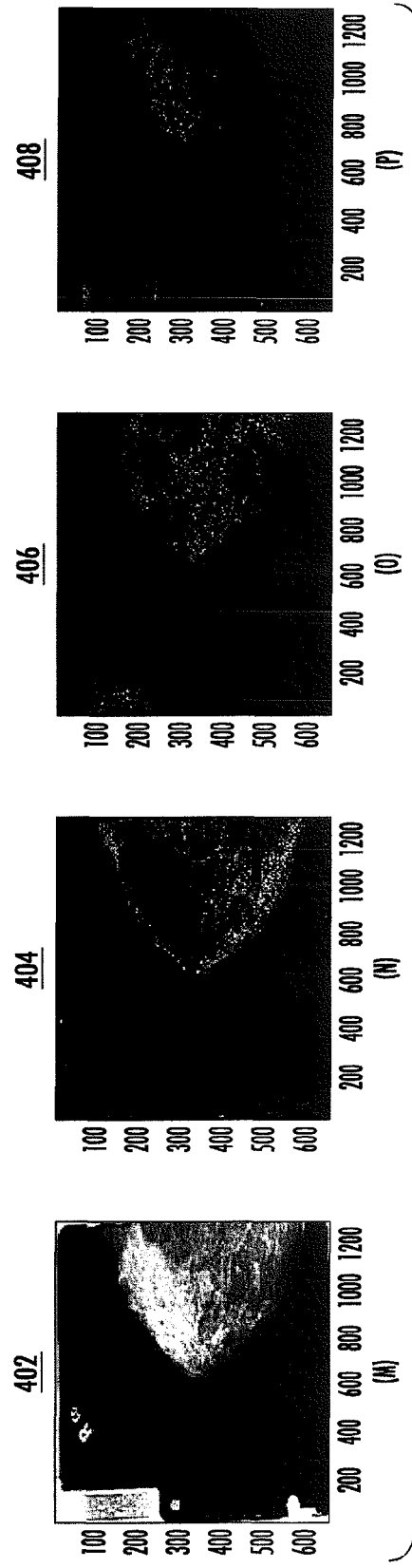
Figure 6:
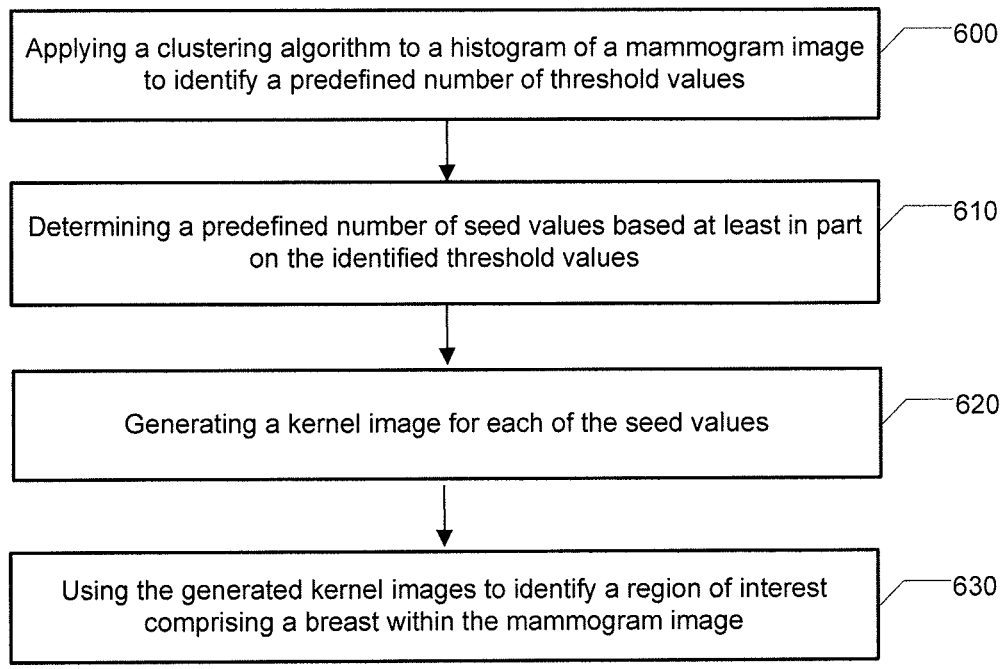
Figure 7:
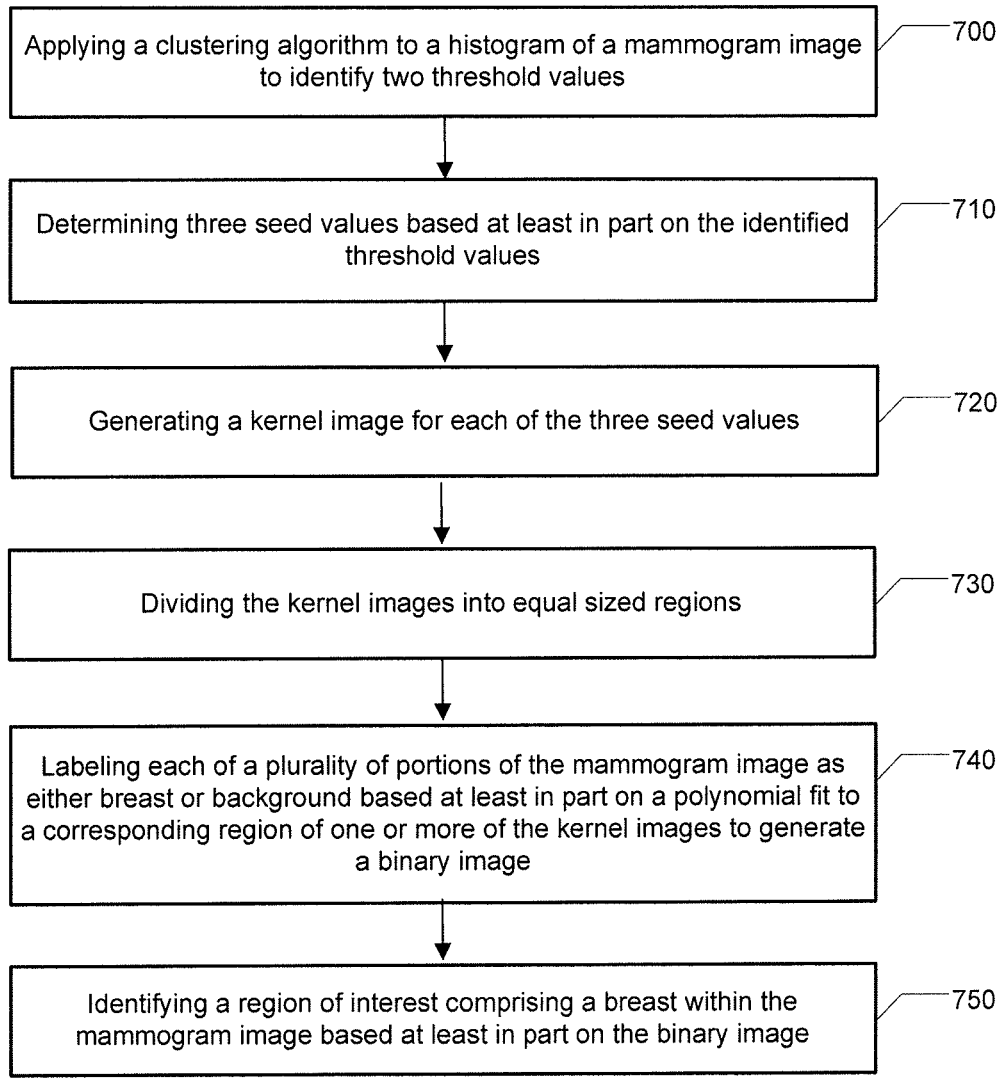

Having thus described embodiments of the invention in general terms, reference will now be made to the accompanying drawings, which are not necessarily drawn to scale, and wherein:

FIG. 1 illustrates a block diagram of a segmentation apparatus for identifying a region of interest within a mammogram image according to some example embodiments;

FIG. 2 illustrates a system for identifying a region of interest within a mammogram image according to some example embodiments;

FIG. 3 illustrates a flow of operations for identifying a region of interest within a mammogram image according to some example embodiments;

FIGS. 4A-4D illustrate example kernel images that may be generated for various mammogram images according to some example embodiments;

FIGS. 5A-5D illustrate several examples of identification of a region of interest within a mammogram on the basis of a binary image according to some example embodiments;

FIG. 6 illustrates a flowchart according to an example method for identifying a region of interest within a mammogram image according to some example embodiments; and FIG. 7 illustrates a flowchart according to another example method for identifying a region of interest within a mammogram image according to some example embodiments.

DETAILED DESCRIPTION

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

As used herein, the terms "data," "content," "information" and similar terms may be used interchangeably to refer to data capable of being transmitted, received, displayed and/or stored in accordance with various example embodiments. Thus, use of any such terms should not be taken to limit the spirit and scope of the disclosure. Further, where a computing device is described herein to receive data from another computing device, it will be appreciated that the data may be received directly from the another computing device or may be received indirectly via one or more intermediary computing devices, such as, for example, one or more servers, relays, routers, network access points, and/or the like.

Referring now to FIG. 1, FIG. 1 illustrates a block diagram of a segmentation apparatus 102 for identifying a region of interest within a mammogram image according to some example embodiments. It will be appreciated that the segmentation apparatus 102 as well as the illustrations in other figures are each provided as an example of some embodiments and should not be construed to narrow the scope or spirit of the disclosure in any way. In this regard, the scope of the disclosure encompasses many potential embodiments in addition to those illustrated and described herein. As such, while FIG. 1 illustrates one example of a configuration of an apparatus for identifying a region of interest within a mammogram image, numerous other configurations may also be used to implement embodiments of the present invention.

The segmentation apparatus 102 may be embodied as any computing device or combination of a plurality of computing devices configured to identify a region of interest within a mammogram image in accordance with one or more example embodiments. In this regard, by way of non-limiting example, the segmentation apparatus 102 may be at least partially embodied as one or more servers, a server cluster, a cloud computing infrastructure, one or more desktop computers, one or more laptop computers, one or more workstations, one or more network nodes, multiple computing devices in communication with each other, an entity(ies) of a Picture Archiving and Communication System (PACS), any combination thereof, and/or the like.

In an example embodiment the segmentation apparatus 102 includes various means for performing the various functions described herein. These means may include, for example, one or more of a processor 110, memory 112, communication interface 114, user interface 116, or segmenting unit 118 for performing the various functions herein described. The means of the segmentation apparatus 102 as described herein may be embodied as, for example, circuitry, hardware elements (e.g., a suitably programmed processor, combinational logic circuit, and/or the like), a computer program product comprising computer-readable program instructions (e.g., software or firmware) stored on a computer-readable medium (e.g. memory 112) that is executable by a suitably configured processing device (e.g., the processor 110), or some combination thereof.

The processor 110 may, for example, be embodied as various means including one or more microprocessors, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 1 as a single processor, in some embodiments the processor 110 may comprise a plurality of processors. The plurality of processors may be embodied on a single computing device or may be distributed across a plurality of computing devices collectively configured to function as the segmentation apparatus 102. The plurality of processors may be in operative communication with each other and may be collectively configured to perform one or more functionalities of the segmentation apparatus 102 as described herein. In some embodiments, the processor 110 may be configured to execute instructions stored in the memory 112 or otherwise accessible to the processor 110. These instructions, when executed by the processor 110, may cause the segmentation apparatus 102 to perform one or more of the functionalities of the segmentation apparatus 102 as described herein. As such, whether configured by hardware or software methods, or by a combination thereof, the processor 110 may comprise an entity capable of performing operations according to embodiments of the present invention while configured accordingly. Thus, for example, when the processor 110 is embodied as an ASIC, FPGA or the like, the processor 110 may comprise specifically configured hardware for conducting one or more operations described herein. Alternatively, as another example, when the processor 110 is embodied as an executor of instructions, such as may be stored in the memory 112, the instructions may specifically configure the processor 110 to perform one or more algorithms and operations described herein.

The memory 112 may include, for example, volatile and/or non-volatile memory. Although illustrated in FIG. 1 as a single memory, the memory 112 may comprise a plurality of memories. The plurality of memories may be embodied on a single computing device or distributed across a plurality of computing devices. The memory 112 may comprise, for example, a hard disk, random access memory, cache memory, flash memory, an optical disc (e.g., a compact disc read only memory (CD-ROM), digital versatile disc read only memory (DVD-ROM), or the like), circuitry configured to store information, or some combination thereof. In this regard, the memory 112 may comprise any non-transitory computer readable storage medium. The memory 112 may be configured to store information, data, applications, instructions, or the like for enabling the segmentation apparatus 102 to carry out various functions in accordance with example embodiments of the present invention. For example, in some example embodiments, the memory 112 is configured to buffer input data for processing by the processor 110. Additionally or alternatively, in some example embodiments, the memory 112 is configured to store program instructions for execution by the processor 110. The memory 112 may store information in the form of static and/or dynamic information. This stored information may be stored and/or used by the segmenting unit 118 during the course of performing its functionalities.

The communication interface 114 may be embodied as any device or means embodied in circuitry, hardware, a computer program product comprising computer readable program instructions stored on a computer readable medium (e.g., the memory 112) and executed by a processing device (e.g., the processor 110), or a combination thereof that is configured to receive and/or transmit data from/to another device, such as, for example, a workstation 202 (shown in FIG. 2), a Picture Archiving and Communication System (PACS) apparatus 204 (shown in FIG. 2), mammography unit 206 (shown in FIG. 2), and/or the like. In some example embodiments, the communication interface 114 is at least partially embodied as or otherwise controlled by the processor 110. In this regard, the communication interface 114 may be in communication with the processor 110, such as via a bus. The communication interface 114 may include, for example, an antenna, a transmitter, a receiver, a transceiver and/or supporting hardware or software for enabling communications with another computing device. The communication interface 114 may be configured to receive and/or transmit data using any protocol that may be used for communications between computing devices. As an example, the communication interface 114 may be configured to receive and/or transmit data using any protocol and/or communications technology that may be used for communicating over a network, such as the network 208 illustrated in FIG. 2. By way of example, the communication 114 may be configured to facilitate communication between a data sever 204 and one or more terminals 202, as will be described further herein below. The communication interface 114 may additionally be in communication with the memory 112, user interface 116, and/or segmenting unit 118, such as via a bus.

The user interface 116 may be in communication with the processor 110 to receive an indication of a user input and/or to provide an audible, visual, mechanical, or other output to a user. As such, the user interface 116 may include, for example, a keyboard, a mouse, a joystick, a display, a touch screen display, a microphone, a speaker, and/or other input/output mechanisms. In some example embodiments wherein the segmentation apparatus 102 is embodied as one or more servers, aspects of the user interface 116 may be more limited, or the user interface 116 may be eliminated entirely. In embodiments including a user interface 116, the user interface 116 may be in communication with the memory 112, communication interface 114, and/or segmenting unit 118, such as via a bus.

The segmenting unit 118 may be embodied as various means, such as circuitry, hardware, a computer program product comprising computer readable program instructions stored on a computer readable medium (e.g., the memory 112) and executed by a processing device (e.g., the processor 110), or some combination thereof and, in some example embodiments, is embodied as or otherwise controlled by the processor 110. In embodiments wherein the segmenting unit 118 is embodied separately from the processor 110, the segmenting unit 118 may be in communication with the processor 110. The segmenting unit 118 may further be in communication with one or more of the memory 112, communication interface 114, or user interface 116, such as via a bus.

Referring now to FIG. 2, FIG. 2 illustrates a block diagram of a system 200 for identifying a region of interest within a mammogram image according to some example embodiments. In this regard, FIG. 2 illustrates an example of a system in which the segmentation apparatus 102 may be implemented. In at least some embodiments, the system 200 includes a workstation 202. The system 200 may further include a mammography unit 204 and/or a PACS (Picture Archiving and Communication System) apparatus 206, which may be configured to communicate with each other and/or with the workstation 200 over the network 208. The network 208 may comprise one or more wireless networks (e.g., a cellular network, wireless local area network, wireless metropolitan area network, and/or the like), one or more wireline networks (e.g., a wired local area network), or some combination thereof, and in some embodiments comprises at least a portion of the internet.

A workstation 202 may be embodied as any computing device by which a radiologist or other user may access and view mammography images. As non-limiting examples, a workstation 202 may comprise a desktop computer, laptop computer, an access terminal, mobile terminal, mobile computer, mobile phone, mobile communication device, tablet computing device, or the like. While mammography images viewed on the workstation 202 may be locally stored, in some example embodiments, the viewed mammography images may be accessed by the workstation 202 from one or more of a mammography unit 204 or PACS apparatus 206 over the network 208. Accordingly, in some example embodiments, at least some aspects of the user interface 116 may be implemented on a workstation 202.

The mammography unit 204 may comprise any device configured to capture a mammogram image. The mammography unit 204 may be configured to send or otherwise provide access to a captured mammogram image to the workstation 202, where it may be viewed by a user of the workstation 202. Additionally or alternatively, the mammography unit 204 may be configured to send or otherwise provide access to a captured mammogram image to a PACS apparatus 206 so that the mammogram image may be stored and archived on a PACS.

The PACS apparatus 206 may accordingly comprise a server or other entity of a PACS, which may archive and store mammogram images, such as may be captured by the mammography unit 204. The PACS apparatus 206 may be configured to provide access to archived and stored images to the workstation 202 via the network 208 such that the images may be viewed by a user of the workstation 202. By way of non-limiting example, the PACS apparatus 206 may be embodied as one or more servers, a server cluster, a cloud computing infrastructure, one or more desktop computers, one or more laptop computers, one or more network nodes, multiple computing devices in communication with each other, any combination thereof, and/or the like.

In some example embodiments, the segmentation apparatus 102 may be at least partially implemented on the PACS apparatus 206. In such example embodiments, a region of interest of a mammogram image requested by the workstation 202 may be identified on the PACS apparatus 206 in accordance with one or more example embodiments. The PACS apparatus 206 may accordingly be configured to provide a mammogram image to the workstation 202 along with an indication of the identified region of interest.

Additionally or alternatively, in some example embodiments, the segmentation apparatus 102 may be at least partially implemented on a workstation 202. In such example embodiments, a region of interest within a mammogram image may be locally identified at the workstation 202 in accordance with one or more example embodiments.

In view of the foregoing description of the system 200, it will be appreciated that in various embodiments, the segmentation apparatus 102 may be implemented on a workstation 202, on a PACS apparatus 206, or aspects of the segmentation apparatus 102 may be distributed across the elements of the system 200. However, it will be appreciated that the segmentation apparatus 102 is not limited to embodiment in the context of the system 200, and may comprise a stand-alone computing device or plurality of computing devices, which may be implemented within, or even outside of the context of the system 200.

In some example embodiments, the segmenting unit 118 associated with a segmentation apparatus 102 is configured to process a mammogram image to identify a region of interest within the mammogram image comprising an image of a breast. In this regard, as will be further described, the segmenting unit 118 may segment a mammogram image into a first portion comprising the identified region of interest, and a second portion that may include an image background, external objects, labels, annotations, and/or the like that may lie outside of the breast region.

In some example embodiments, the segmenting unit 118 may process images having a common defined input size. In such embodiments, this input size may be customizable, or may be implementation specific. For example, the input size may be set to 700×1000 pixels. If a mammogram image has a size other than the input size, the mammogram image may be scaled to the input size prior to processing by the segmenting unit 118.

FIG. 3 illustrates a flow of operations for identifying a region of interest within a mammogram image according to some example embodiments. The ensuing discussion will reference FIG. 3 in the context of discussing identification of a region of interest within a mammogram image in accordance with various example embodiments. The segmenting unit 118 may take as input a mammogram image 302. The mammogram image 302 may comprise an original mammogram image, such as may be captured by a mammography unit 204. Alternatively, the mammogram image 302 may comprise a scaled version of an original mammogram image.

The segmenting unit 118 may be configured to perform a histogram thresholding operation 304 on the mammogram image 302. In this regard, the segmenting unit 118 may be configured to apply a clustering algorithm to a histogram of the mammogram image to identify a predefined number of threshold values. In some example embodiments, applying the clustering algorithm may comprise clustering the histogram into a predefined number of clusters and identifying the threshold values on the basis of the clusters. In this regard, the threshold values may comprise values separating adjacent clusters.

In some example embodiments, the histogram is clustered into three clusters. The first cluster may represent a low intensity breast region including a breast skin line. The second cluster may represent a medium intensity breast region including soft breast tissue. The third cluster may represent a high intensity breast region including any calcified regions of the breast. The third cluster may additionally represent external objects that may be captured in a mammogram image. Two threshold values may be identified on the basis of these three clusters.

While any appropriate clustering algorithm may be applied, in some example embodiments, a histogram of a mammogram image may be clustered to identify the threshold values as follows. At the start of the clustering the number of clusters may be equal to the number of image histogram bins. The histogram bins may be clustered by the segmentation unit 118 based on a similarity measure. In this regard, during the clustering process, the segmentation unit 118 may join adjacent clusters (bins) together if they are similar. Clustering is stopped in such example embodiments when a predefined number (e.g., 3) of clusters are found.

In order to determine which histogram bins to cluster, the segmentation unit 118 may calculate a distance between two adjacent clusters. In this regard, the distance between two adjacent clusters provides a measure of how similar two clusters are. The smaller the distance, the higher the similarity between the two clusters. The distance measurement may be based on both the difference between the means of the two clusters and the variance of the resulting cluster.

The histogram may be viewed as a probability density function. Let h (z) be the histogram of the target image where z indicates the gray level. The histogram h (z) gives the occurrence frequency of the pixel with gray level z. Accordingly, we can define p (z)=h (z)/N, where N is the number of pixels in the image. The probability of the occurrence of a pixel with gray level z may thus be defined as p (z). Another function may be defined which indicates the occurrence probability of pixels belonging to a cluster $C_k$ $$P(C_k) = \sum_{z=T_{k_1}}^{T_{k_n}} p(z), \quad (1)$$

$$\sum_{k=1}^{k} P(C_k) = 1$$

where $T_k$ is the intensity value in the cluster $C_k$. So basically the function $P(C_k)$ is the sum of the occurrence probability of each intensity value in a cluster k.

A distance function between two clusters may be defined as:

$$\text{Dist}(C_{k_1}, C_{k_2}) = \sigma_a^2(C_{k_1} \cup C_{k_2}) \sigma_1^2(C_{k_1} \cup C_{k_2}) \qquad (2)$$

where $\sigma_a^2(C_{k_1} \cup C_{k_2})$ is the intra class variance of two merged clusters, $\sigma_1^2(C_{k_1} \cup C_{k_2})$ is the inter class variance, $m(C_k)$ is the mean of the cluster $C_k$. The inter-class variance takes into account the probability occurrence of both clusters and the difference between their means. The inter-class variance may be defined as follows:

$$\sigma_1^2(C_{k_1} \cup C_{k_2}) = \frac{P(C_{k_1})P(C_{k_2})}{(P(C_{k_1}) + P(C_{k_2}))^2}(m(C_{k_1}) - m(C_{k_2}))^2 \qquad (3)$$

where $m(C_k)$ is the mean of cluster $C_k$, defined as follows:

$$m(C_k) = \frac{1}{P(C_k)} \sum_{z=T_{k_1}}^{T_{k_n}} z * p(z) \qquad (4)$$

The intra-class variance $\sigma_a^2(C_{k_1} \cup C_{k_2})$ is the variance of all the pixel values in the merged cluster and is defined as follows:

$$\sigma_a^2(C_{k_1} \cup C_{k_2}) = \sum_{z=T_{k_1}}^{T_{k_n}} ((z - M(C_{k_1} \cup C_{k_s}))^2 p(z)) \qquad (5)$$

Referring again to FIG. 3, FIG. 3 illustrates identification of a first threshold value 306 and a second threshold value 308 based on the clustering of the histogram of the image 302 into three intensity regions. In this regard, the threshold value 306 may separate a low intensity region and a medium intensity region of the histogram. The threshold value 308 may separate the medium intensity region and a high intensity region of the histogram. Accordingly, in the example of FIG. 3, the histogram of the image has been clustered into a first range including all pixels having an intensity value less than the threshold value 306, a second range including all pixels having an intensity value between the threshold value 306 and the threshold value 308, and a third range including all pixels having an intensity value greater than the threshold value 308. The first range may include low intensity regions of the breast and background pixels. The second range may include the bulk of breast tissue, including soft breast tissue. The third range may include calcified breast tissue, labels, wedges, noise, and/or the like.

The segmentation unit 118 of some example embodiments is further configured to determine a predefined number of seed values based at least in part on the threshold values identified from histogram thresholding. In embodiments wherein two threshold values are determined, the segmentation unit 118 may be configured to determine three seed values. The first seed value may comprise a weighted mean representing low intensity breast region including a breast skin line, as represented by the seed value 310 indicated in FIG. 3. The second seed value may comprise a weighted mean representing a medium intensity breast region including soft breast tissue, as represented by the seed value 312 indicated in FIG. 3. The third seed value may comprise a weighted mean representing a high intensity breast region including any calcified regions of the breast, as represented by the seed value 314 indicated in FIG. 3. In some example embodiments, all three seeds may be determined automatically on the basis of the threshold values without any user-specified parameters.

In order to calculate the first seed representing the low intensity region, the segmentation unit 118 may compute the gradient of the histogram which identifies the peaks in the histogram. All of the histogram bins to the left of (e.g., below) the first peak may be removed so as to exclude the background pixels from the seed calculation. Additionally, all of the histogram bins from the first peak to the second peak may be removed. In this regard, the second peak may be regarded as representing the pixels that belong to the skin line of the breast. Even though some of the pixels removed between the first and second peaks could in fact be part of the breast, it is not of great importance at this point since the aim is to be able to detect one intensity value that can be used to create a probability distribution. After removal of the pixels, the weighted mean of the remaining pixels up to the first threshold value may be calculated, yielding a seed value representing the low intensity region of the breast.

The second seed value may be calculated as the weighted mean of the pixels that have an intensity value greater than the first threshold value and less than the second threshold value.

As the region of the histogram of the mammogram image having an intensity higher than the second threshold value may include labels, wedges and other external objects, and noise, some pixels within this region may be removed prior to calculating the third seed value. In this regard, the gradient of the region having an intensity greater than the second threshold value may be calculated to find the peaks. Pixels having an intensity value corresponding to the largest peak may be removed. The third seed may be calculated as the weighted mean of the remaining bins in the region of the histogram having an intensity greater than the second threshold value.

While the preceding discussion discussed background pixels being within the histogram cluster including pixels having an intensity below the first threshold value, such as may occur in monochrome2 images, it will be appreciated that in some images, background pixels may occur within the histogram cluster including pixels having an intensity greater than the second threshold value, such as may occur in monochrome1 images. However, for images in which background pixels occur in the high intensity region of the histogram, the background pixels may be removed by removing the largest peak of the gradient of the region, as described above.

In some example embodiments, the segmentation unit 118 is additionally configured to use the seed values to generate kernel images. In this regard, a kernel image may be generated for each seed value. In some example embodiments, the segmentation unit 118 may generate a kernel image for a seed value by applying a probability distribution kernel to the pixel values of the mammogram image on the basis. Accordingly, in embodiments wherein three seed values are calculated, the segmentation unit 118 may generate three kernel images. In such embodiments the first kernel image may have a distribution centered around the first seed value and may represent pixels corresponding to a low intensity breast region including the breast skin line. An example of such a first kernel image is illustrated by the kernel image 316 in FIG. 3. The second kernel image may have a distribution centered around the second seed value and may represent pixels corresponding to a medium intensity breast region including soft breast tissue. An example of such a second kernel image is illustrated by the kernel image 318 in FIG. 3. The third kernel image may have a distribution centered around the third seed value and may represent pixels corresponding to a high intensity breast region including any calcified regions of the breast. An example of such a third kernel image is illustrated by the kernel image 320 in FIG. 3.

In some example embodiments, a Gaussian probability distribution kernel may be applied to the mammogram image to generate a kernel image as follows:

$$h(x, y) = P(I(x, y) \mid (\text{seed}, \sigma)) = \frac{1}{\sqrt{2\pi\sigma}} \exp - 0.5 \frac{(I(x, y) - \text{seed})^2}{\sigma} \quad (6)$$

where "seed" is the value of a seed for which a kernel image is being generated, a is the variance, and I (x, y) is a pixel at position x, y. The function (6) thus describes the probability that a pixel I (x, y) can be generated by a Gaussian distribution N (seed, $\sigma_2$). While function (6) describes the application of a Gaussian distribution, it will be appreciated that any appropriate probability distribution kernel may be applied for kernel generation. A purpose of performing kernel generation is to create a membership metric. In this regard, if the pixels are close in intensity value to the seed value, they will have a high kernel value, whereas if they are different the kernel value will be close to zero. As such, each kernel value may capture the membership of a respective region of the mammogram image.

FIGS. 4A-4D illustrate example kernel images that may be generated for various mammogram images according to some example embodiments. In this regard, the images in column 402 in FIGS. 4A-4D may comprise mammogram images. The images in column 404 in FIGS. 4A-4D may comprise kernel images generated based on a seed value representing the low intensity portion of the corresponding mammogram images in column 402. Accordingly, for example, the image 404 in FIG. 4A may comprise a kernel image generated based on a seed value representing the low intensity portion of the image 402 in FIG. 4A. The images in column 406 in FIGS. 4A-4D may comprise kernel images generated based on a seed value representing the medium intensity portion of the corresponding mammogram images in column 402. Accordingly, for example, the image 406 in FIG. 4C may comprise a kernel image generated based on a seed value representing the medium intensity portion of the image 402 in FIG. 4C. The images in column 408 in FIGS. 4A-4D may comprise kernel images generated based on a seed value representing the high intensity portion of the corresponding mammogram images in column 402. Accordingly, for example, the image 408 in FIG. 4D may comprise a kernel image generated based on a seed value representing the high intensity portion of the image 402 in FIG. 4D.

In some example embodiments the segmentation unit 118 is also configured to use the generated kernel images to identify a region of interest comprising a breast within an input mammogram image. The region of interest may, for example, comprise an area defined by a geometric shape, such as a rectangle surrounding an identified breast region of a mammogram image. As another example, the identified region of interest may comprise a region defined by a detected contour of the breast skin line.

The segmentation unit 118 may be configured to use the kernel images to identify a region of interest by fitting polynomials to regions of the kernel images. In this regard, the segmentation unit 118 may divide each of the kernel images into equal sized regions, as illustrated by operation 322 of FIG. 3. The size of the regions may comprise a configurable parameter, or may vary depending on implementation. The segmentation unit 118 may fit each region with a polynomial, as illustrated by operation 324 of FIG. 3. In this regard, the segmentation unit 118 may select, for a respective region, a polynomial within a range of orders (e.g., from 1 to 4 in some example embodiments) that best fits the region.

Fitting the regions of the kernel images with such polynomials may help to discriminate a breast region from a non-breast region of a mammogram image. In this regard, background regions, artifacts, and external objects captured on a mammogram image and/or which overlap the area of the breast may comprise regions of substantially uniform intensity. In contrast, the intensities of the breast may not be uniform, as the breast is in fact a textured object. Therefore, the variation in intensity of a breast region compared to non-breast artifacts and objects in a mammogram image may be leveraged to discriminate the breast from any external objects on the basis of polynomial fitting.

More particularly, the image data can be interpreted as samples of a piecewise smooth surface function. Regions of substantial uniformity may be fit with flat surfaces, and regions that exhibit texture may be fit with higher order surfaces. The order of the surface shape may be controlled automatically by fitting surfaces to regions of the image data and testing if the surface fits by comparing the mean square residual error of the fit to the original data.

In some example embodiments, eight possible surface types may be fit to a region of a kernel image based on surface curvature. These surface types may, for example, comprise: peak, pit, ridge, valley, saddle ridge, saddle valley, flat, and minimal. These surfaces can be approximated by bivariate polynomials of order M. In some example embodiments, a polynomial of order 4 may be assumed to be sufficient to represent these surfaces.

The usage of relatively low-order polynomials (e.g., of order 4 or less) to represent surfaces may have a relatively low computational requirement. In the case of M=4, the polynomial may be represented as:

$$f(x, y) = \sum_{i+j \leq M} a_{ij} x^i y^j = a_{00} + a_{10}x + a_{11}xy + a_{20}y^2 + a_{21}x^2y + a_{12}xy^2 + a_{30}x^3 + a_{03}y^3 + a_{31}x^3y + a_{22}x^2y^2 + a_{13}xy^3 + a_{40}x^4 + a_{04}y^4 \quad (7)$$

In fitting a polynomial to a region, the root mean square (RMS) fit error from the surface data may be computed for each polynomial option. If a region is fit with a polynomial having an order satisfying a threshold order (e.g., order 3 or higher), the region may be considered to comprise a portion of a breast region. If, however, a region is fit with a polynomial that does not have an order satisfying the threshold order, such as a polynomial having an order of 1 or 2, the region may be assumed to have a flat or less complex surface and to represent a background region, such as may contain an artifact object or noise.

The segmentation unit 118 may label portions of the input mammogram image (e.g., the originally captured mammogram image or a scaled version of the mammogram image) as either breast or background based at least in part on the polynomial fit to a corresponding region of one or more of the kernel images to generate a binary image. For example, each pixel in the input mammogram image may be labeled as breast or background based on a polynomial fit to a corresponding region of one or more of the kernel images. In this regard, if a corresponding region of a kernel image is fit with a polynomial satisfying a threshold order (e.g., order 3 or higher), the portion of the mammogram image may be labeled as breast. If, however, none of the kernel images have a corresponding region that has been fitted with a polynomial satisfying the threshold order, the portion of the mammogram image may be labeled as background. An example of a binary image that may result from this labeling is illustrated in the binary image 326 of FIG. 3. In this regard, the white portion of the binary image 326 has been labeled breast, and the black portion of the binary image 326 has been labeled as background.

The segmentation unit 118 may be configured to identify the region of interest comprising a breast within the input mammogram image based at least in part on the binary image. In some embodiments, the segmentation unit 118 may determine the largest contiguous portion (e.g., the largest connected component) of the binary image labeled as breast. In this regard, some labels, artifacts, or other objects may have been labeled as breast in the binary image. However, as the breast itself may be assumed to be the largest object in the mammogram image, the largest contiguous portion of the binary image labeled as breast may be considered to define the actual breast region. The segmentation unit 118 may accordingly identify the region of interest in the input mammogram image as the region corresponding to the largest contiguous portion of the binary image labeled as breast. For example, the white rectangle around the breast in the image 328 of FIG. 3 illustrates an example region of interest comprising the breast that may be identified on the basis of the binary image 326.

In some example embodiments, the segmentation unit 118 may use a connected component labeling algorithm to detect the largest contiguous portion of the binary image labeled as breast. Such a connected component labeling algorithm may assign a unique label to each maximal connected region of pixels of the binary image labeled as breast.

An example of such a connected component labeling algorithm that may be used by the segmentation unit 118 may be defined as follows. It will be appreciated, however, that the following connected component labeling algorithm is provided merely by example and not by way of limitation. Accordingly, other connected component labeling algorithms may be substituted for the following example within the scope of the disclosure. The binary image resulting from the segmentation may be defined as I. F, B may be defined as the non overlapping subsets of I corresponding to foreground (e.g., breast) and background respectively. A connected component C of I is a subset of F such that all the pixels in C are connected. In some example embodiments, rather than iterating on all the pixels in the binary image, each region block may be treated as a pixel so as to reduce the computational complexity. Accordingly, where a pixel is referred to in the ensuing description of the example connected component labeling algorithm, it will be appreciated that labeling analysis may be performed on a region basis rather than on a pixel basis.

The connected component labeling algorithm may generate a new image in which a unique label is assigned to pixels belonging to the same connected component. The background pixels may remain untouched, while the foreground pixels (e.g., pixels labeled as breast in the binary image) may be assigned labels. The labels may be assigned by performing two raster scans. During the first scan, labels may be assigned to each pixel based on the values of its neighbors. In this implementation a 4-connectivity neighborhood may be used where x is the pixel to be labeled:

$$\begin{array}{cc} & p \\ q & x \end{array}$$

The algorithm may be described using the following cases. For all the foreground pixels in the image where x is the pixel to be labeled and its neighbors are p, q:

1. If the neighbors of the pixel x are both background pixels, then x may be assigned a new label.
2. If the neighbors both have the same label, then x may be assigned that label.
3. If one of the neighbors is a background and the other has a label, then x may be assigned that label.
4. If both neighbors have a different label, then x may be assigned either label and the two labels may be regarded as equivalent. This equivalence may be stored in an array and may be updated (e.g., constantly updated) during the scan. For instance, if p had a label value of 1, and q had a label value of 2 then a common label needs to be decided upon to label x. This may be done by setting one of the labels to be a survivor and the other may be deleted (in this case assume p's label is retained). The equivalence of the two labels may be saved in a simple data structure such as an array which can keep track of the labels that are merged into one. During the second raster scan the equivalences that are stored in the array may be applied to the labeled image. Accordingly, in the second scan q's label may be changed from 2 to 1.

FIGS. 5A-5D illustrate several examples of identification of a region of interest within a mammogram on the basis of a binary image according to some example embodiments. The images in column 502 in FIGS. 5A-5D may comprise input mammogram images. The images in column 504 in FIGS. 5A-5D may comprise binary images that may result from segmentation of the corresponding input mammogram images in column 502 in accordance with some example embodiments. Accordingly, for example, the image 504 in FIG. 5A may comprise a binary image that may result from segmentation of the corresponding image 502 in FIG. 5A. The images in column 506 in FIGS. 5A-5D comprise mammogram images with regions of interest (e.g., rectangular regions identified around the breasts) identified on the basis of the corresponding binary images in column 504. Accordingly, for example, the image 506 in FIG. 5A may comprise a mammogram image with a region of interest identified on the basis of the binary image 504 in FIG. 5A.

Of note, the input mammogram image 510 in FIG. 5C includes an external clip object touching the breast region. As may be seen from the binary image 512, the bulk of the clip may be identified as background (black) rather than breast (white) through polynomial fitting, as the clip regions may be fitted with a low-order polynomial. Accordingly, in the image 514, the region of interest excludes the bulk of the clip except for that portion immediately adjacent to the breast.

Referring to FIG. 5D, as another example from FIG. 5, the input mammogram image 516 includes a label in the upper left corner of the image, as well as some noise artifacts. Referring to the corresponding binary image 518, it may be seen that the label and some of these noise artifacts have been labeled as breast (white) rather than background (black). However, through determination of the largest contiguous portion of the binary image that has been labeled as breast, the region of interest identified in the image 520 may comprise only the actual breast portion of the mammogram image rather than the label and noise artifacts.

In some example embodiments, the identified region of interest may be used to automatically position a mammogram image within a display or viewing port of a workstation, such as a workstation 202 so that the radiologist does not have to manually pan or scan the image to view the breast. Further, in some example embodiments, the region of interest may be used to facilitate text overlay placement such that labels and annotations may be placed outside of the region of interest and, thus, outside of the breast region of the mammogram image. As another example, the region of interest may be used in some example embodiments to mask out external objects from the mammogram image. For example, clips and/or other objects outside of the region of interest may be masked from view in the image presented to a radiologist.

In some example embodiments, the identified region of interest may be used to identify the breast skin line. In this regard, boundary pixels of the breast region may be identified and a region centered on the boundary pixels may be defined. The corresponding region in the original image may be input to an algorithm that may detect a skin line. For example, a shape model of the breast (e.g., an active shape model, active appearance model, and/or the like) may be used to identify the skin line. As another example, a dynamic programming approach, such as may use minimum cost or other heuristic search method, may be used to identify the skin line.

Referring now to FIG. 6, FIG. 6 illustrates a flowchart according to an example method for identifying a region of interest within a mammogram image according to some example embodiments. In this regard, FIG. 6 illustrates a method that may be performed by a segmentation apparatus 102. The operations illustrated in and described with respect to FIG. 6 may, for example, be performed by, with the assistance of, and/or under the control of one or more of the processor 110, memory 112, communication interface 114, user interface 116, or segmenting unit 118. Operation 600 may comprise applying a clustering algorithm to a histogram of a mammogram image to identify a predefined number of threshold values. The processor 110, memory 112, and/or segmenting unit 118 may, for example, provide means for performing operation 600. Operation 610 may comprise determining a predefined number of seed values based at least in part on the identified threshold values. The processor 110, memory 112, and/or segmenting unit 118 may, for example, provide means for performing operation 610. Operation 620 may comprise generating a kernel image for each of the seed values. The processor 110, memory 112, and/or segmenting unit 118 may, for example, provide means for performing operation 620. Operation 630 may comprise using the generated kernel images to identify a region of interest comprising a breast within the mammogram image. The processor 110, memory 112, and/or segmenting unit 118 may, for example, provide means for performing operation 630.

FIG. 7 illustrates a flowchart according to another example method for identifying a region of interest within a mammogram image according to some example embodiments. In this regard, FIG. 7 illustrates a method that may be performed by a segmentation apparatus 102. The operations illustrated in and described with respect to FIG. 7 may, for example, be performed by, with the assistance of, and/or under the control of one or more of the processor 110, memory 112, communication interface 114, user interface 116, or segmenting unit 118. Operation 700 may comprise applying a clustering algorithm to a histogram of a mammogram image to identify two threshold values. The processor 110, memory 112, and/or segmenting unit 118 may, for example, provide means for performing operation 700. Operation 710 may comprise determining three seed values based at least in part on the two identified threshold values. The processor 110, memory 112, and/or segmenting unit 118 may, for example, provide means for performing operation 710. Operation 720 may comprise generating a kernel image for each of the three seed values. The processor 110, memory 112, and/or segmenting unit 118 may, for example, provide means for performing operation 720. Operation 730 may comprise dividing the kernel images into equal sized regions. The processor 110, memory 112, and/or segmenting unit 118 may, for example, provide means for performing operation 730. Operation 740 may comprise labeling each of a plurality of portions of the mammogram image as either breast or background based at least in part on a polynomial fit to a corresponding region of one or more of the kernel images to generate a binary image. The processor 110, memory 112, and/or segmenting unit 118 may, for example, provide means for performing operation 740. Operation 750 may comprise identifying a region of interest comprising a breast within the mammogram image based at least in part on the binary image. The processor 110, memory 112, and/or segmenting unit 118 may, for example, provide means for performing operation 750.

FIGS. 6-7 each illustrate a flowchart of a system, method, and computer program product according to example embodiments of the invention. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by one or more memory devices of a server, desktop computer, laptop computer, mobile computer, or other computing device (e.g., a segmentation apparatus 102, workstation 202, server 204, or combination thereof) and executed by a processor (e.g., the processor 110) in the computing device. In some embodiments, the computer program instructions comprising the computer program product(s) which embody the procedures described above may be stored by memory devices of a plurality of computing devices. As will be appreciated, any such computer program product may be loaded onto a computer or other programmable apparatus to produce a machine, such that the computer program product including the instructions which execute on the computer or other programmable apparatus creates means for implementing the functions specified in the flowchart block(s). Further, the computer program product may comprise one or more computer-readable memories on which the computer program instructions may be stored such that the one or more computer-readable memories can direct a computer or other programmable apparatus to function in a particular manner, such that the computer program product comprises an article of manufacture which implements the function specified in the flowchart block(s). The computer program instructions of one or more computer program products may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks or steps of the flowcharts support combinations of means for performing the specified functions and combinations of steps for performing the specified functions. It will also be understood that one or more blocks of the flowcharts, and combinations of blocks in the flowcharts, may be implemented by special purpose hardware-based computer systems which perform the specified functions or steps, or combinations of special purpose hardware and computer program product(s).

The above described functions may be carried out in many ways. For example, any suitable means for carrying out each of the functions described above may be employed to carry out embodiments of the invention. In one embodiment, a suitably configured processor may provide all or a portion of the elements of the invention. In another embodiment, all or a portion of the elements of the invention may be configured by and operate under control of a computer program product. The computer program product for performing the methods of embodiments of the invention includes a computer-readable storage medium, such as the non-volatile storage medium, and computer-readable program code portions, such as a series of computer instructions, embodied in the computer-readable storage medium.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for identifying a region of interest within a mammogram image, the method comprising:
    applying a clustering algorithm to a histogram of the mammogram image to identify a predefined number of threshold values;
    determining a predefined number of seed values based at least in part on the identified threshold values;
    generating, by a processor, at least one kernel image corresponding to at least one of the seed values, wherein an intensity of a particular pixel within the at least one kernel image is determined based at least in part on a difference between the intensity of a corresponding pixel in the mammogram image and the at least one of the seed values associated with the at least one kernel image; and
    using the generated kernel images to identify a region of interest comprising a breast within the mammogram image.

2. The method of claim 1, wherein applying the clustering algorithm to the histogram of the mammogram image comprises:
    clustering the histogram into three clusters; and
    identifying two threshold values on the basis of the three clusters.

3. The method of claim 2, wherein the first cluster represents a low intensity breast region including a breast skin line, the second cluster represents a medium intensity breast region including soft breast tissue, and the third cluster represents a high intensity breast region including any calcified regions of the breast.

4. The method of claim 1, wherein determining a predefined number of seed values comprises determining three seed values comprising a first seed value comprising a weighted mean representing low intensity breast region including a breast skin line, a second seed value comprising a weighted mean representing a medium intensity breast region including soft breast tissue, and a third seed value comprising a weighted mean representing a high intensity breast region including any calcified regions of the breast.

5. The method of claim 1, wherein generating a kernel image for each of the seed values comprises, for each seed value, applying a probability distribution kernel to the pixel values of the mammogram image.

6. The method of claim 1, wherein generating a kernel image for each of the seed values comprises:
    generating a first kernel image having a distribution centered around a first seed value and representing pixels corresponding to a representing low intensity breast region including a breast skin line;
    generating a second kernel image having a distribution centered around a second seed value and representing pixels corresponding to a medium intensity breast region including soft breast tissue; and
    generating a third kernel image having a distribution centered around a third seed value and representing pixels corresponding to a high intensity breast region including any calcified regions of the breast.

7. The method of claim 1, wherein using the generated kernel images to identify a region of interest comprising a breast within the mammogram image comprises:
    dividing the kernel images into equal sized regions;
    fitting each region with a polynomial;
    labeling each of a plurality of portions of the mammogram image as either breast or background based at least in part on a polynomial fit to a corresponding region of one or more of the kernel images to generate a binary image; and
    identifying the region of interest comprising a breast within the mammogram image based at least in part on the binary image.

8. The method of claim 7, wherein labeling each of a plurality of portions of the mammogram image as either breast or background comprises labeling a portion breast in an instance in which a polynomial fit to a corresponding region of one or more of the kernel images has an order satisfying a threshold order.

9. The method of claim 7, wherein using the generated kernel images to identify a region of interest comprising a breast within the mammogram image further comprises:
    determining a largest contiguous portion of the binary image labeled as breast; and wherein identifying the region of interest comprising a breast within the mammogram image based at least in part on the binary image comprises identifying the region of interest comprising a breast within the mammogram image as the region within the mammogram image corresponding to the determined largest contiguous portion of the binary image labeled as breast.

10. An apparatus for identifying a region of interest within a mammogram image, the apparatus comprising at least one processor, wherein the at least one processor is configured to cause the apparatus to at least:
   apply a clustering algorithm to a histogram of the mammogram image to identify a predefined number of threshold values;
   determine a predefined number of seed values based at least in part on the identified threshold values;
   generate a kernel image for each of the seed values, the kernel image corresponding to at least one of the seed values, wherein an intensity of a particular pixel within the kernel image is determined based at least in part on a difference between the intensity of a corresponding pixel in the mammogram image and the seed values associated with the kernel image; and
   use the generated kernel images to identify a region of interest comprising a breast within the mammogram image.

11. The apparatus of claim 10, wherein the at least one processor is configured to cause the apparatus to apply the clustering algorithm to the histogram of the mammogram image at least in part by:
   clustering the histogram into three clusters; and
   identifying two threshold values on the basis of the three clusters.

12. The apparatus of claim 11, wherein the first cluster represents a low intensity breast region including a breast skin line, the second cluster represents a medium intensity breast region including soft breast tissue, and the third cluster represents a high intensity breast region including any calcified regions of the breast.

13. The apparatus of claim 10, wherein the at least one processor is configured to cause the apparatus to determine a predefined number of seed values at least in part by determining three seed values comprising a first seed value comprising a weighted mean representing low intensity breast region including a breast skin line, a second seed value comprising a weighted mean representing a medium intensity breast region including soft breast tissue, and a third seed value comprising a weighted mean representing a high intensity breast region including any calcified regions of the breast.

14. The apparatus of claim 10, wherein the at least one processor is configured to cause the apparatus to generate a kernel image for each of the seed values at least in part by, for each seed value, applying a probability distribution kernel to the pixel values of the mammogram image.

15. The apparatus of claim 10, wherein the at least one processor is configured to cause the apparatus to generate a kernel image for each of the seed values at least in part by:
   generating a first kernel image having a distribution centered around a first seed value and representing pixels corresponding to a representing low intensity breast region including a breast skin line;
   generating a second kernel image having a distribution centered around a second seed value and representing pixels corresponding to a medium intensity breast region including soft breast tissue; and
   generating a third kernel image having a distribution centered around a third seed value and representing pixels corresponding to a high intensity breast region including any calcified regions of the breast.

16. The apparatus of claim 10, wherein the at least one processor is configured to cause the apparatus to use the generated kernel images to identify a region of interest comprising a breast within the mammogram image at least in part by:
   dividing the kernel images into equal sized regions;
   fitting each region with a polynomial;
   labeling each of a plurality of portions of the mammogram image as either breast or background based at least in part on a polynomial fit to a corresponding region of one or more of the kernel images to generate a binary image; and
   identifying the region of interest comprising a breast within the mammogram image based at least in part on the binary image.

17. The apparatus of claim 16, wherein labeling each of a plurality of portions of the mammogram image as either breast or background comprises labeling a portion breast in an instance in which a polynomial fit to a corresponding region of one or more of the kernel images has an order satisfying a threshold order.

18. The apparatus of claim 16, wherein the at least one processor is further configured to cause the apparatus to:
   determine a largest contiguous portion of the binary image labeled as breast; and
   wherein identifying the region of interest comprising a breast within the mammogram image based at least in part on the binary image comprises identifying the region of interest comprising a breast within the mammogram image as the region within the mammogram image corresponding to the determined largest contiguous portion of the binary image labeled as breast.

19. The apparatus of claim 10, further comprising at least one memory storing instructions that when executed by the at least one processor cause the apparatus to:
   apply a clustering algorithm to a histogram of the mammogram image to identify a predefined number of threshold values;
   determine a predefined number of seed values based at least in part on the identified threshold values;
   generate a kernel image for each of the seed values; and
   use the generated kernel images to identify a region of interest comprising a breast within the mammogram image.

20. A computer program product for identifying a region of interest within a mammogram image, the computer program product comprising at least one non-transitory computer-readable storage medium having computer-readable program instructions stored therein, the computer-readable program instructions comprising:
   program instructions configured to apply a clustering algorithm to a histogram of the mammogram image to identify a predefined number of threshold values;
   program instructions configured to determine a predefined number of seed values based at least in part on the identified threshold values;
   program instructions configured to generate a kernel image for each of the seed values, wherein an intensity of a particular pixel within the kernel image is determined based at least in part on a difference between the intensity of a corresponding pixel in the mammogram image and the seed values associated with the kernel image; and program instructions configured to use the generated kernel images to identify a region of interest comprising a breast within the mammogram image.

\* \* \* \* \*